US010049291B2

(12) United States Patent
Nishikawa et al.

(10) Patent No.: US 10,049,291 B2
(45) Date of Patent: Aug. 14, 2018

(54) IMAGE-PROCESSING APPARATUS, IMAGE-PROCESSING METHOD, AND COMPUTER PROGRAM PRODUCT

(71) Applicant: PFU LIMITED, Kahoku-shi, Ishikawa (JP)

(72) Inventors: Mitsuru Nishikawa, Ishikawa (JP); Kiyoto Kosaka, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 15/355,047

(22) Filed: Nov. 17, 2016

(65) Prior Publication Data

US 2018/0046876 A1   Feb. 15, 2018

(30) Foreign Application Priority Data

Aug. 10, 2016 (JP) .................................. 2016-157937

(51) Int. Cl.
*G06K 9/34* (2006.01)
*G06K 9/46* (2006.01)
*G06T 7/00* (2017.01)

(52) U.S. Cl.
CPC ........... *G06K 9/344* (2013.01); *G06K 9/4628* (2013.01); *G06K 9/4638* (2013.01);
(Continued)

(58) Field of Classification Search
CPC .............................................. G06K 9/00–9/82
See application file for complete search history.

(56) References Cited

U.S. PATENT DOCUMENTS 6,157,738 A * 12/2000 Wang ................. G06K 9/00449
                                                    382/198
6,757,081 B1 * 6/2004 Fan ..................... H04N 1/00002
                                                    358/2.1

(Continued)

FOREIGN PATENT DOCUMENTS

JP    H06-187495 A    7/1994
JP    2001-291056 A   10/2001
(Continued)

OTHER PUBLICATIONS

Decision to Grant issued in corresponding Japanese Patent Application No. 2016-157937, dated Jun. 27, 2017.

*Primary Examiner* — Sean Motsinger
(74) *Attorney, Agent, or Firm* — McDermott Will & Emery LLP

(57) ABSTRACT

According to the present disclosure, an image-processing apparatus identifies for each gradation value a connected component of pixels of not less than or not more than the gradation value neighboring and connected to each other in an input image, thereby generating hierarchical structure data of a hierarchical structure including the connected component, extracts based on the hierarchical structure data a connected component satisfying character likelihood as a character-like region, acquires a threshold value of binarization used exclusively for the character-like region, acquires a corrected region where the character-like region is binarized, acquires a background where a gradation value of a pixel included in a region of the input image other than the corrected region is changed to a gradation value for a background, and acquires a binary image data of a binary image composed of the corrected region and the background region.

13 Claims, 13 Drawing Sheets

(52) U.S. Cl.
CPC .......... G06K 9/4652 (2013.01); G06T 7/0081 (2013.01); *G06K 2209/01* (2013.01); *G06T 2207/20144* (2013.01); *G06T 2207/20148* (2013.01)

(56) References Cited

U.S. PATENT DOCUMENTS

| | | | | |
|---|---|---|---|---|
| 7,672,022 B1* | 3/2010 | Fan | ............ | G06T 5/003 348/207.99 |
| 2001/0012400 A1* | 8/2001 | Wang | ............ | G06K 9/00456 382/181 |
| 2001/0021034 A1* | 9/2001 | Suzuki | ............ | H04N 1/40062 358/1.9 |
| 2008/0123945 A1* | 5/2008 | Andrew | ............ | G06K 9/00456 382/164 |
| 2010/0073735 A1* | 3/2010 | Hunt | ............ | G06T 3/0031 358/462 |
| 2010/0157340 A1* | 6/2010 | Chen | ............ | G06K 9/00456 358/1.9 |
| 2010/0310170 A1* | 12/2010 | Li | ............ | G06T 7/13 382/173 |
| 2011/0158517 A1* | 6/2011 | Dai | ............ | G06K 9/32 382/165 |
| 2012/0155754 A1* | 6/2012 | Chen | ............ | G06K 9/00456 382/164 |
| 2013/0156288 A1* | 6/2013 | Chinnaswamy | ... | G06K 9/00469 382/135 |
| 2014/0297256 A1* | 10/2014 | Rogowski | ............ | G06F 17/289 704/2 |
| 2015/0106755 A1* | 4/2015 | Moore | ............ | G06F 3/0484 715/765 |
| 2015/0356374 A1* | 12/2015 | Mase | ............ | G06K 9/4671 382/195 |
| 2017/0140205 A1* | 5/2017 | Gueguen | ............ | G06K 9/0063 |

FOREIGN PATENT DOCUMENTS

| | | |
|---|---|---|
| JP | 2002-112044 A | 4/2002 |
| JP | 2015-026290 A | 2/2015 |
| JP | 2016-151978 A | 8/2016 |

\* cited by examiner (A) (B)  (C) (D)  (E) (F)

IMAGE-PROCESSING APPARATUS, IMAGE-PROCESSING METHOD, AND COMPUTER PROGRAM PRODUCT

CROSS-REFERENCE TO RELATED APPLICATION

This application is based upon and claims the benefit of priority from Japanese Patent Application No. 2016-157937, filed on Aug. 10, 2016, the entire contents of which are incorporated herein by reference.

BACKGROUND OF THE DISCLOSURE

1. Field of the Disclosure

The present disclosure relates to an image-processing apparatus, an image-processing method, and a computer program product.

2. Description of the Related Art

Techniques of extracting character strings in images have been disclosed.

JP-A-2015-26290 discloses a technique of segmenting the concentration values with respect to each predetermined range, generating a component tree of connected components extracted from the image within each of the ranges, and performing text extraction based on a connection relation in the component tree.

However, a conventional character-recognizing apparatus disclosed in JP-A-2015-26290 has a problem that there is a necessity of carrying out optical character recognition (OCR) processing with respect to the connected components and confirming likelihood of candidate characters for extracting a character string.

SUMMARY OF THE DISCLOSURE

It is an object of the present disclosure to at least partially solve the problems in the conventional technology.

An image-processing apparatus according to one aspect of the present disclosure is an image-processing apparatus including a hierarchical structure generating unit that identifies for each gradation value a connected component of pixels of not less than or not more than the gradation value neighboring and connected to each other in an input image and generates hierarchical structure data of a hierarchical structure including the connected component, a region extracting unit that determines based on the hierarchical structure data whether the connected component satisfies a feature of character likelihood and extracts the connected component satisfying the feature of character likelihood as a character-like region, a correcting unit that acquires based on a maximum gradation value and a minimum gradation value of pixels included in the character-like region a threshold of binarization used exclusively for the character-like region and acquires based on the threshold of binarization a corrected region where the character-like region is binarized, and an image acquiring unit that acquires a background region where a gradation value of a pixel included in a region of the input image other than the corrected region is changed to a gradation value for a background and acquires binary image data of a binary image composed of the corrected region and the background region.

An image-processing method according to another aspect of the present disclosure is an image-processing method including a hierarchical structure generating step of identifying for each gradation value a connected component of pixels of not less than or not more than the gradation value neighboring and connected to each other in an input image and generating hierarchical structure data of a hierarchical structure including the connected component, a region extracting step of determining based on the hierarchical structure data whether the connected component satisfies a feature of character likelihood and extracting the connected component satisfying the feature of character likelihood as a character-like region, a correcting step of acquiring based on a maximum gradation value and a minimum gradation value of pixels included in the character-like region a threshold of binarization used exclusively for the character-like region and acquiring based on the threshold of binarization a corrected region where the character-like region is binarized, and an image acquiring step of acquiring a background region where a gradation value of a pixel included in a region of the input image other than the corrected region is changed to a gradation value for a background and acquiring binary image data of a binary image composed of the corrected region and the background region.

A computer program product according to still another aspect of the present disclosure is a computer program product having a non-transitory tangible computer readable medium including programmed instructions for causing, when executed by a computer, the computer to perform an image-processing method including a hierarchical structure generating step of identifying for each gradation value a connected component of pixels of not less than or not more than the gradation value neighboring and connected to each other in an input image and generating hierarchical structure data of a hierarchical structure including the connected component, a region extracting step of determining based on the hierarchical structure data whether the connected component satisfies a feature of character likelihood and extracting the connected component satisfying the feature of character likelihood as a character-like region, a correcting step of acquiring based on a maximum gradation value and a minimum gradation value of pixels included in the character-like region a threshold of binarization used exclusively for the character-like region and acquiring based on the threshold of binarization a corrected region where the character-like region is binarized, and an image acquiring step of acquiring a background region where a gradation value of a pixel included in a region of the input image other than the corrected region is changed to a gradation value for a background and acquiring binary image data of a binary image composed of the corrected region and the background region.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

An image-processing apparatus, an image-processing method, and a computer program product according to the present disclosure will be described in detail below with reference to drawings. Note that the present disclosure is not limited to this embodiment.

Configuration of the Embodiment

Figure 1:
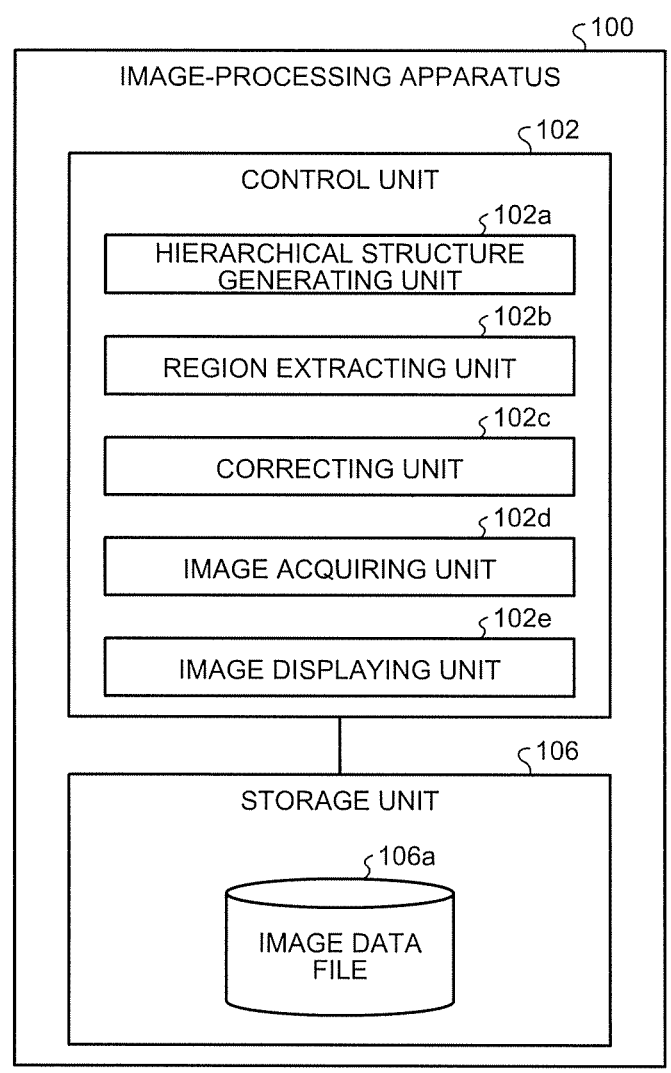
FIG. 1 is a block diagram of an example of a configuration of an image-processing apparatus according to one embodiment.

An example of the configuration of an image-processing apparatus 100 according to an embodiment of the present disclosure will be described below with reference to FIG. 1, and then, processing etc. according to the embodiment will be described in detail. FIG. 1 is a block diagram of the example of a configuration of an image-processing apparatus 100 according to an embodiment.

In the embodiment described below, the image-processing apparatus 100 will be described as an example in order to specify the technical idea of the present disclosure. It is not intended to limit the present disclosure to the image-processing apparatus 100, and the present disclosure is applicable equally to image-processing apparatuses 100 of other embodiments included in the scope of the claims.

Function distribution of the image-processing apparatus 100 described as an example in the embodiment is not limited to the configuration described later. The image-processing apparatus 100 can be configured in such a manner that any units are functionally or physically separated or integrated, as long as similar advantageous effects and functions can be exhibited.

The image-processing apparatus 100 includes, as schematically illustrated in FIG. 1, a control unit 102 and a storage unit 106. These sections of the image-processing apparatus 100 are connected communicatively to each other via an optional communication path.

The image-processing apparatus 100 may further include an input/output unit. The input/output unit performs input/output (I/O) of data.

The input/output unit may be any one, some or all of a key input unit, a touch panel, a control pad (a touch pad, a game pad or the like), a mouse, a keyboard, and a microphone, for example.

The input/output unit may be any one or both of a display unit (a display, a monitor, a touch panel made of crystal liquid or organic EL or the like) configured to display information such as an application, and a sound output unit (a speaker or the like) configured to output sound information as sound.

The image-processing apparatus 100 may further include an interface unit. The image-processing apparatus 100 may be connected intercommunicatively to an external apparatus (for example, image-reading apparatus or the like) via the interface unit.

The interface unit may be any one or both of an antenna to be connected to any one or both of a communication line and a telephone line, and an interface (NIC or the like) to be connected to a communication apparatus such as a router. Moreover, it may be a communication interface that performs a communication control between the image-processing apparatus 100 and a network.

The network may include remote communications or the like such as any one or both of wire communications and wireless communications (WiFi or the like). The interface unit may be an input/output interface that performs input/output control between the image-reading apparatus or the like and the control unit 102.

The control unit 102 may control the interface unit and the input/output unit.

The storage unit 106 stores any one, some, or all of various kinds of database, tables, and files. Moreover, the storage unit 106 may store various kinds of application programs (for example, user applications and the like).

The storage unit 106 is a storage unit that may be any one, some, or all of a memory such as a random access memory (RAM) or a read-only memory (ROM), a fixed disc device such as a hard disc, a solid state drive (SSD), a flexible disc, and an optical disc, for example.

The storage unit 106 may store computer programs and the like for giving instructions to a controller and to perform various processes.

An image data file 106a out of these constituent elements of the storage unit 106 stores image data. The image data may be color image data, grayscale image data, binary image data, input image data or the like.

The control unit 102 may be constituted of tangible controllers that controls generally the image-processing apparatus 100, including any one, some, or all of a central processing unit (CPU), many core CPU, a graphics processing unit (GPU), a digital signal processor (DSP), a large scale integration (LSI), an application specific integrated circuit (ASIC), a field-programming gate array (FPGA) and the like or control circuitry.

The control unit 102 has an internal memory for storing a control program, a program that regulates various procedures or the like, and required data, and it performs information processing for executing various processes based on these programs.

The control unit 102 includes a hierarchical structure generating unit 102a, a region extracting unit 102b, a correcting unit 102c, an image acquiring unit 102d and an image displaying unit 102e as principal constituent elements.

The hierarchical structure generating unit 102a identifies for each gradation value a connected component of pixels of not less than or not more than the gradation value neighboring and connected to each other in an input image, and generates hierarchical structure data of a hierarchical structure including the connected component.

The hierarchical structure generating unit 102a may identify for each gradation value a connected component of pixels of not less than or not more than the gradation value neighboring and connected to each other in the input image, and generate hierarchical structure data of a hierarchical structure of the connected component of the whole gradation values.

The whole gradation values may be all of the gradation values in 32, 64, 128, 256 gradations or the like.

Further, the hierarchical structure generating unit 102a may identify for each gradation value a connected component of pixels of not less than or not more than the gradation value neighboring and connected to each other in the input image, and generate hierarchical structure data of a hierarchical structure based on a gradation width.

Regarding 256 gradations for example, the hierarchical structure based on a gradation width may be a 256-hierarchical structure or the like of every gradation.

The region extracting unit 102b determines based on the hierarchical structure data whether the connected component satisfies a feature of character likelihood, and extracts the connected component satisfying the feature of character likelihood as a character-like region.

The region extracting unit 102b may determine based on the hierarchical structure data whether the connected component satisfies a character-like sharpness, and extract the connected component satisfying the character-like sharpness as a character-like region.

The region extracting unit 102b may determine based on the hierarchical structure data whether the connected component satisfies a character-like contrast, and extract the connected component satisfying the character-like contrast as a character-like region.

The region extracting unit 102b may determine based on the hierarchical structure data whether the connected component satisfies a character-like area, and extract the connected component satisfying the character-like area as a character-like region.

The region extracting unit 102b may determine based on the hierarchical structure data whether a quotient of a dividend and a divisor satisfies a threshold of character-like sharpness. In that case, the dividend is a difference between an area of a connected component and an area of a neighboring connected component on the hierarchical structure, and the divisor is the area of the neighboring connected component. When the quotient is determined as satisfying the threshold of character-like sharpness, the region extracting unit 102b may extract the connected component as a character-like region.

The region extracting unit 102b may determine based on the hierarchical structure data whether a difference between a maximum gradation value and a minimum gradation value of pixels included in the connected component satisfies a threshold of character-like contrast, and when the difference is determined as satisfying the threshold of character-like contrast, the region extracting unit 102b may extract the connected component as a character-like region.

Further, the region extracting unit 102b determines based on the hierarchical structure data whether the area of the connected component satisfies a threshold of character-like area, and when the area of the connected component is determined as satisfying the threshold of character-like area, the region extracting unit 102b may extract the connected component as a character-like region.

The correcting unit 102c acquires based on the maximum gradation value and the minimum gradation value of the pixels included in the character-like region a threshold of binarization used exclusively for the character-like region, and acquires based on the threshold of binarization a corrected region where the character-like region is binarized.

The correcting unit 102c may acquire a threshold of binarization used exclusively for the character-like region, and acquire based on the threshold of binarization a corrected region where the character-like region is binarized. Here, the threshold is a value obtained by multiplying a difference between the maximum gradation value and the minimum gradation value of pixels included in the character-like region by a predetermined parameter.

Further, the correcting unit 102c may generate a cumulative frequency distribution of an area from a pixel having the minimum gradation value to a pixel having the maximum gradation value included in the character-like region, then acquire a gradation value where a relative cumulative value occupies a predetermined ratio in the cumulative frequency distribution as the threshold of binarization used exclusively for the character-like region, and acquire based on the threshold of binarization the corrected region where the character-like region is binarized.

The image acquiring unit 102d acquires image data. The image acquiring unit 102d may acquire binary image data of the binary image.

Further, the image acquiring unit 102d may acquire a background region where a gradation value of a pixel included in a region of the input image other than the corrected region is changed to a gradation value for a background, and acquire a binary image data of a binary image composed of the corrected region and the background region.

Further, the image acquiring unit 102d may acquire input image data of an input image. The input image may be a color image, or a multivalued image such as a grayscale image. The image acquiring unit 102d may store the image data in the image data file 106a.

The image displaying unit 102e displays image data. The image displaying unit 102e may display the image data via the input/output unit.

Processing of the Embodiment

An example of processing executed in the image-processing apparatus 100 having the above-described configuration will be explained with reference to FIG. 2 to FIG. 22. FIG.

2 is a flowchart of an example of processing in the image-processing apparatus 100 of the embodiment.

Figure 2:
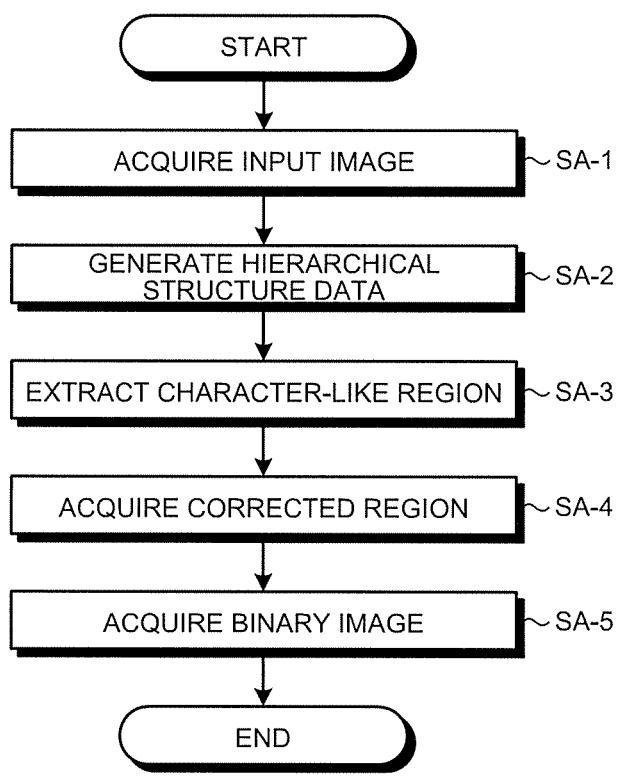
FIG. 2 is a flowchart of an example of processing in the image-processing apparatus according to the embodiment.

As shown in FIG. 2, first the image acquiring unit 102d acquires input image data of an input image as a multivalued image stored in the image data file 106a (Step SA-1).

Figure 3:
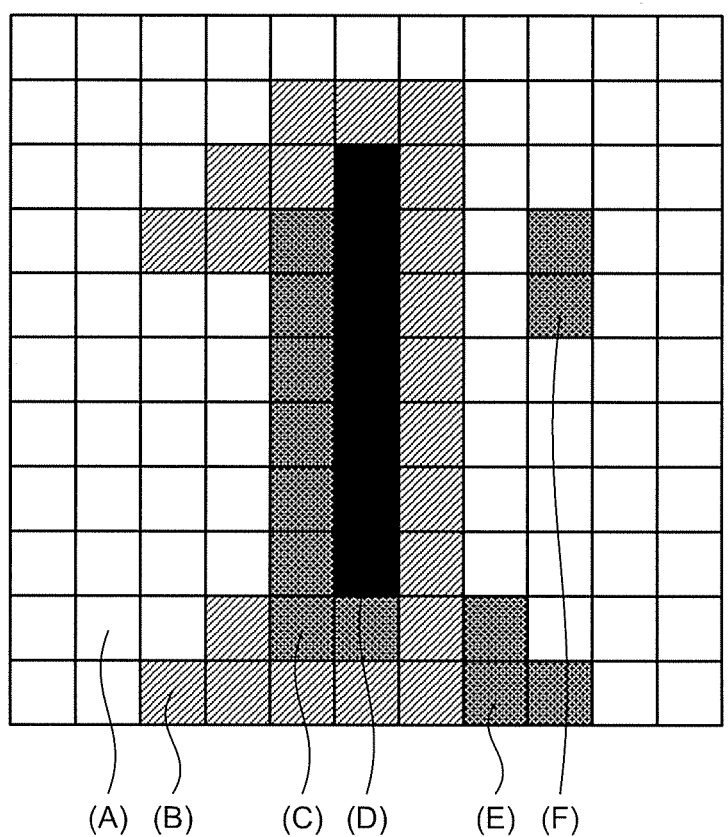
FIG. 3 is a diagram of an example of an input image according to the embodiment.

The following explains an example of an input image according to the embodiment with reference to FIG. 3. FIG. 3 is a diagram of an example of an input image according to the embodiment.

As shown in FIG. 3, in the embodiment, for example, the input image may be a multivalued image composed of pixels of four gradation values of an 11×11 pixel size.

Returning to FIG. 2, the hierarchical structure generating unit 102a identifies for each gradation value a connected component of pixels of not more than the gradation value neighboring and connected to each other in the input image, and generates hierarchical structure data of a hierarchical structure based on the gradation width, which is composed of the connected component of the whole gradation values (Step SA-2).

Figure 4:
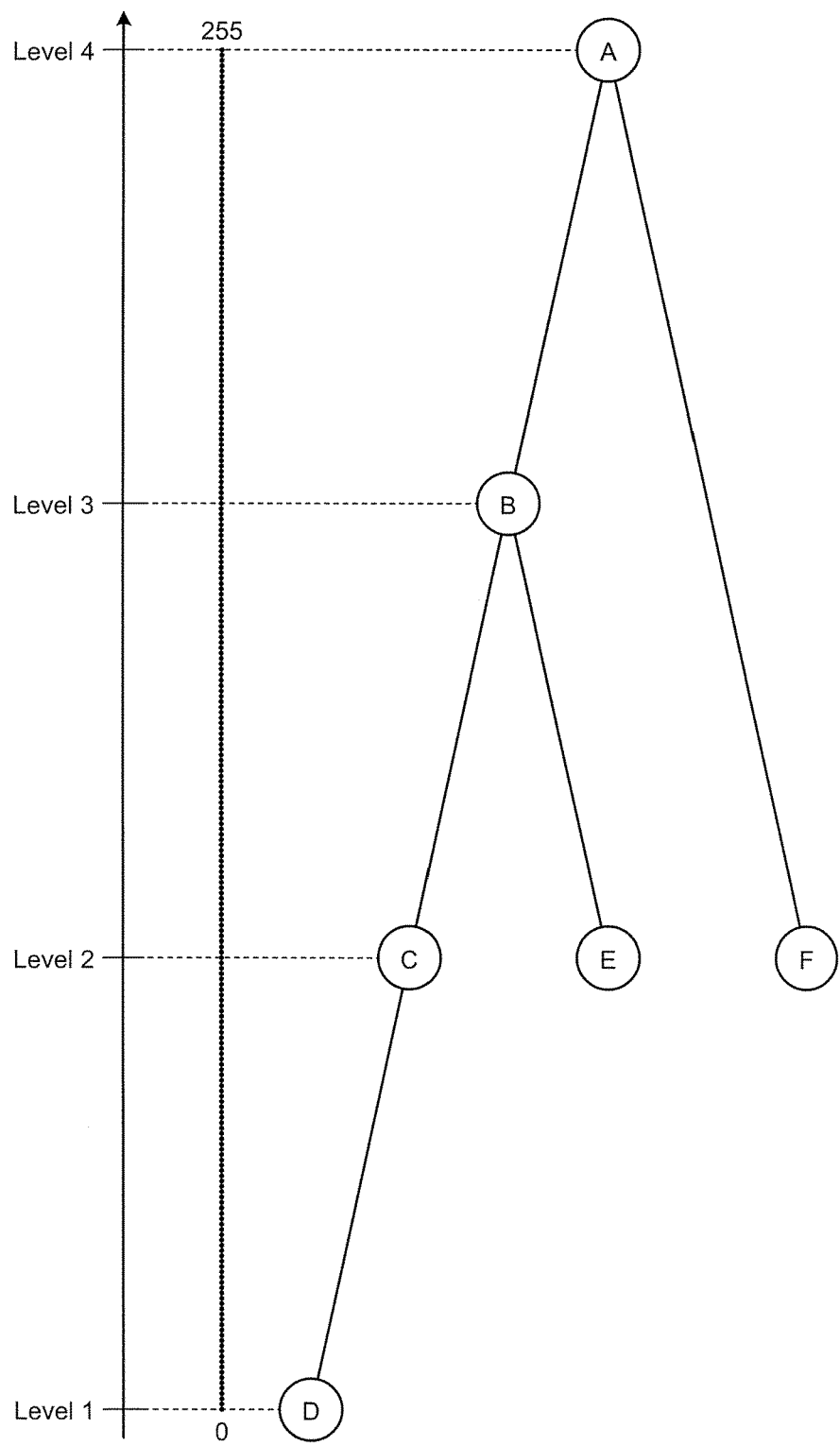
FIG. 4 is a diagram of an example of a hierarchical structure of connected components according to the embodiment.

The following explains an example of a connected component according to an embodiment with reference to FIGS. 4 to 9. FIG. 4 is a diagram of an example of a hierarchical structure of a connected component in the embodiment. FIGS. 5 to 9 are diagrams of an example of a connected component in the embodiment.

As shown in FIG. 4, in the embodiment, hierarchical structure data of a hierarchical structure (Connected Component Tree) using links and nodes may be generated from the connected components in an input image composed of pixels of four gradation values (Levels 1-4) in 256 gradations shown in FIG. 3.

In FIG. 4, 256 round points aligned longitudinally from 0 to 255 indicate respectively the gradation values.

In FIG. 4, a connected component C, a connected component E and a connected component F, which are not in a neighboring connection relation, are in a relation equivalent to each other in the maximum gradation value in the 256 gradations.

Further as shown in FIG. 4, in the embodiment, it is possible to generate hierarchical structure data for connected components different from each other in the maximum gradation values for expressing an inclusion relation corresponding to a sequence of the gradation values, namely, a relation that a connected component having a high maximum gradation value includes a connected component having a low maximum gradation value when the connected components are neighboring and in a connected relation.

Namely, in the embodiment, a connected component corresponding to a parent node in the hierarchical structure is in a relation including a connected component of any one or both of a child node and a grandchild node.

For example, as shown in FIG. 4, in the embodiment, the connected component B is in a relation including a connected component C and a connected component E as child nodes and a connected component D as a grandchild node.

Further as shown in FIG. 4, in the embodiment, hierarchical structure data having a hierarchical structure of 256 gradations of the same pitch width as the gradation width of the 256-gradation input image may be generated.

In this manner, in the embodiment, a hierarchical structure with fine pitch width of 256 gradations and the like allows accurate separation of the connected components.

Figure 5:
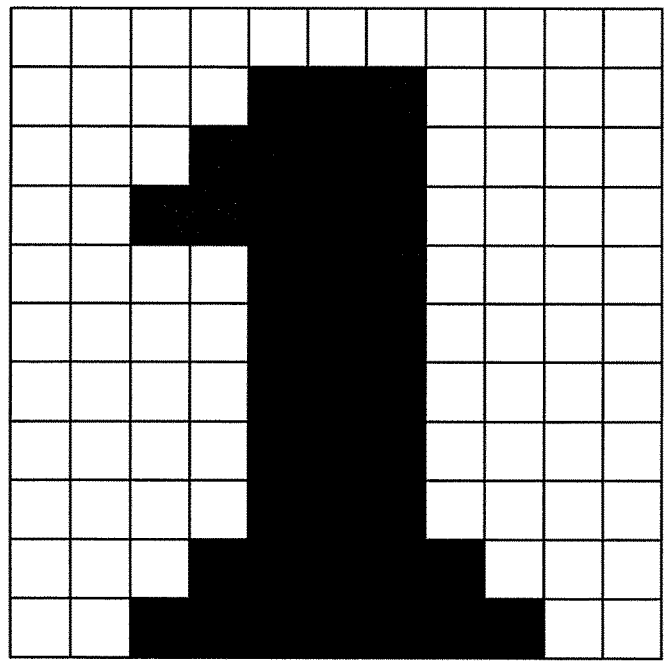
FIG. 5 is a diagram of an example of a connected component according to the embodiment.

Further as shown in FIG. 5, in the embodiment, a region where pixels of not higher than Level 3 are neighboring and connected to each other may be identified as a connected component B on a level lower than the connected component A (white background image of 11×11 pixels: 255 gradation values).

Figure 6:
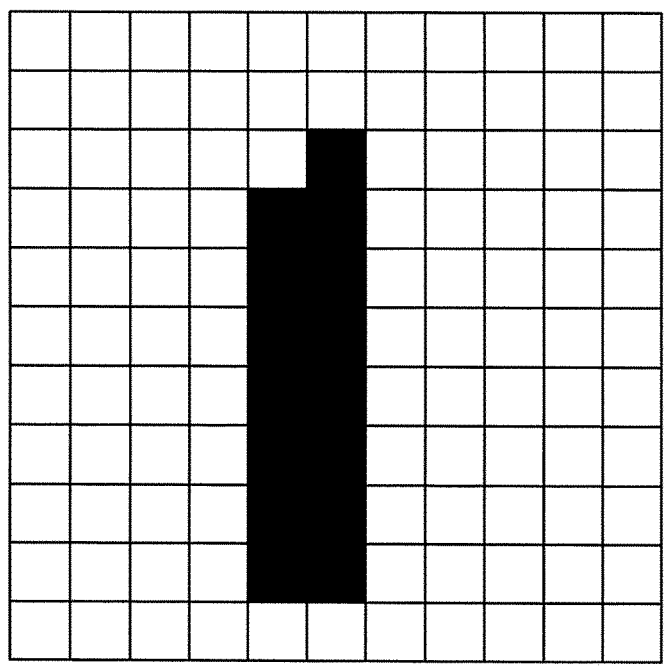
FIG. 6 is a diagram of an example of a connected component according to the embodiment.

Further as shown in FIG. 6, in the embodiment, a region where pixels of not higher than Level 2 are neighboring and connected to each other may be identified as a connected component C on a level lower than the connected component A and on a level lower than the connected component B.

Figure 7:
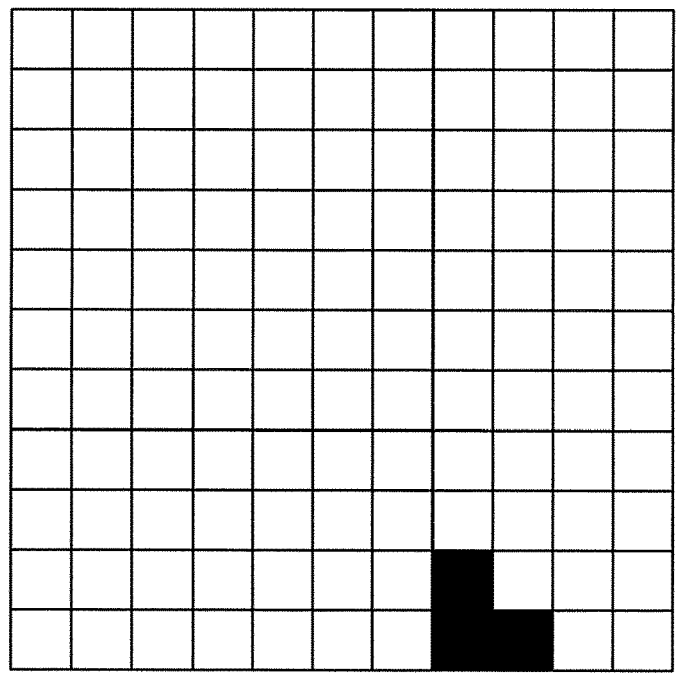
FIG. 7 is a diagram of an example of a connected component according to the embodiment.

Further as shown in FIG. 7, in the embodiment, a region where pixels of not higher than Level 2 are neighboring and connected to each other may be identified as a connected component E on a level lower than the connected component A and on a level lower than the connected component B.

Figure 8:
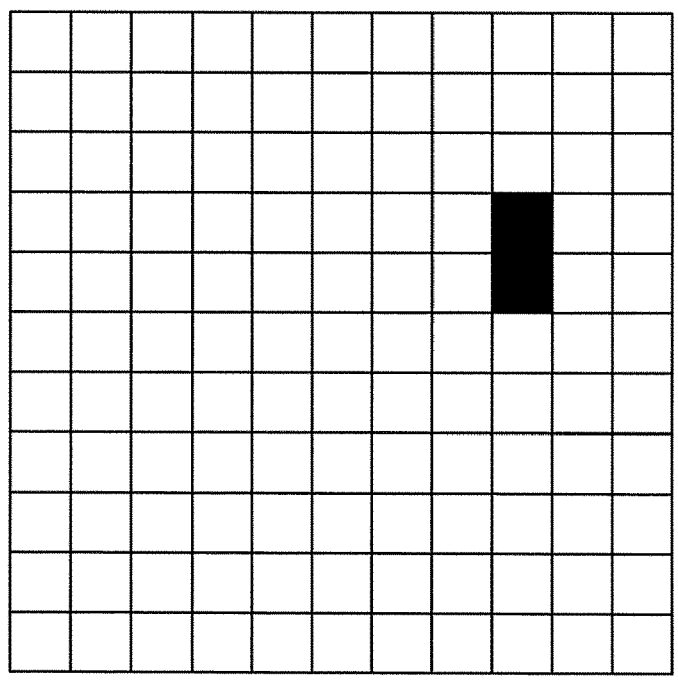
FIG. 8 is a diagram of an example of a connected component according to the embodiment.

Further as shown in FIG. 8, in the embodiment, a region where pixels of not higher than Level 2 neighboring and connected to each other may be identified as a connected component F on a level lower than the connected component A. In the embodiment, the connected component F is a noise in the image.

Figure 9:
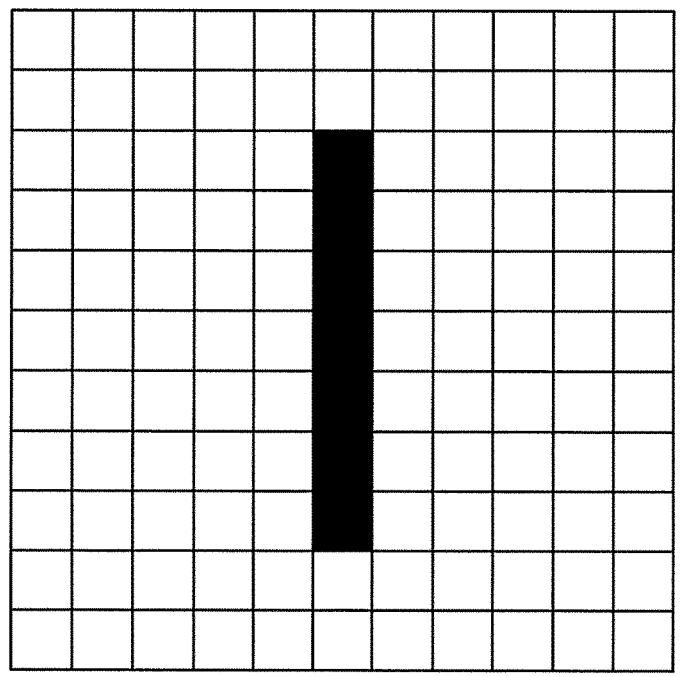
FIG. 9 is a diagram of an example of a connected component according to the embodiment.

Further as shown in FIG. 9, in the embodiment, a region where pixels of not higher than Level 1 are neighboring and connected to each other may be identified as a connected component D (0 gradation value) on a level lower than the connected component A, on a level lower than the connected component B, and on a level lower than the connected component C.

Returning to FIG. 2, the region extracting unit 102b determines based on the hierarchical structure data whether the connected component of each gradation value satisfies the feature of character likelihood, and extracts the connected component satisfying the feature of character likelihood as a character-like region (Step SA-3).

Figure 10:
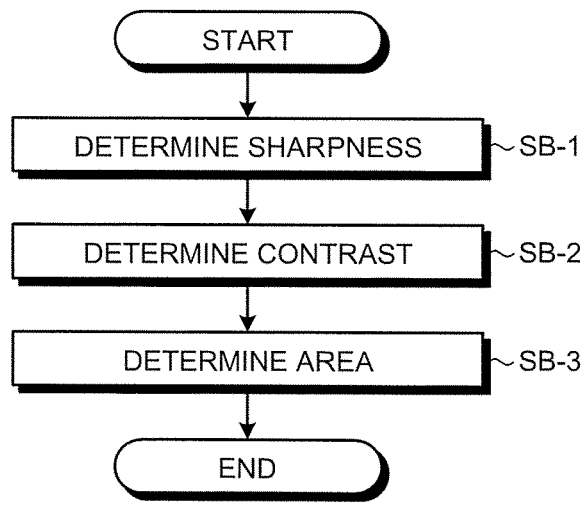
FIG. 10 is a flowchart of an example of processing in the image-processing apparatus according to the embodiment.

The following explains an example of processing of extracting a character-like region according to the embodiment with reference to FIG. 10. FIG. 10 is a flow chart showing an example of processing in the image-processing apparatus 100 of the embodiment.

As shown in FIG. 10, first the region extracting unit 102b determines based on the hierarchical structure data whether a quotient of a dividend and a divisor satisfies the threshold of character-like sharpness. Here, the dividend is a difference between an area of a connected component of each gradation value and an area of a neighboring connected component on the hierarchical structure, and the divisor is the area of the neighboring connected component. When the quotient is determined as satisfying the threshold of character-like sharpness, the processing is shifted to Step SB-2 (Step SB-1).

The character-like sharpness in the embodiment may be determined by using an index expressed by Formula 1 below.

$$(\text{Area}_{\Gamma_{\lambda+\Delta}} - \text{Area}_{\Gamma_\lambda})/\text{Area}_{\Gamma_\lambda} \qquad \text{(Formula 1)}$$

($\text{Area}_{\Gamma_\lambda}$ is an area of a region ($\Gamma_\lambda$) corresponding to a pixel value $\lambda$ on a hierarchical structure, and $\Delta$ is a change amount in pixel value on hierarchical structure)

In the hierarchical structure of FIG. 4 for example, when $\lambda$=Level 3, the region corresponding to the pixel value $\lambda$ in Formula 1 may be the connected component B.

In the embodiment, the sharpness may be determined by setting a threshold with respect to Formula 1 for each node (connected component) on the hierarchical structure, thereby extracting a region of not more than the threshold as a node to satisfy the sharpness.

Further in the embodiment, only the node corresponding to the highest level may be extracted among the extracted nodes in a joint relation on the hierarchical structure.

Specifically in the embodiment, sharpness determination may be performed by setting a threshold to 0.4 by use of Formula 1 as follows and determining whether a value is smaller than the threshold.

$$(Area_{\Gamma_{\lambda+\Lambda}} - Area_{\Gamma_\lambda})/Area_{\Gamma_\lambda} < 0.4$$

The region extracting unit 102b determines based on the hierarchical structure data whether the difference between the maximum gradation value and the minimum gradation value of the pixels included in the connected component satisfying the threshold of character-like sharpness satisfies the threshold of character-like contrast, and when the difference is determined as satisfying the threshold of character-like contrast, the processing is shifted to Step SB-3 (Step SB-2).

The determination of character-like contrast in the embodiment may be performed by using as an index a difference between a maximal pixel value and a minimal pixel value of each extracted connected component as expressed by Formula 2 below.

$$\lambda_{\Gamma_\lambda}^{max} - \lambda_{\Gamma_\lambda}^{min} \quad \text{(Formula 2)}$$

($\lambda_{\Gamma_\lambda}^{max}$ is a maximal value of pixel value included in region $\Gamma_\lambda$, and $\lambda_{\Gamma_\lambda}^{min}$ is a minimal value of pixel value included in region $\Gamma_\lambda$.)

Specifically in the embodiment, the contrast determination may be performed by setting the threshold to 50 by use of Formula 2 below and determining whether the difference is larger than the threshold.

$$50 < \lambda_{\Gamma_\lambda}^{max} - \lambda_{\Gamma_\lambda}^{min}$$

The region extracting unit 102b determines based on the hierarchical structure data whether the area of the connected component that has been determined as satisfying the character-like contrast satisfies the threshold of character-like area, and when the area of the connected component is determined as satisfying the threshold of character-like area, the region extracting unit 102b extracts the connected component as a character-like region (Step SB-3), and the processing is ended.

Here, in the determination on the character-like area in the embodiment, the area of the extracted connected component may be used as an index as expressed by Formula 3 below.

$$Area_{\Gamma_\lambda} \quad \text{(Formula 3)}$$

Specifically in the embodiment, an area determination may be performed by setting the minimal threshold to 5 and the maximal threshold to 20000 and determining by use of Formula 3 whether the area is between the thresholds.

$$5 <= Area_{\Gamma_\lambda} \text{ and } Area_{\Gamma_\lambda} < 20000$$

In typical image data, a character-like region possesses features relating to a character-like sharpness, a character-like contrast (difference between the maximal value and the minimal value of gradation values of pixels in the region), and, the area of the character-like region. In light of this, in the embodiment, these features are employed as standards for extraction of the character-like region.

Returning to FIG. 2, the correcting unit 102c acquires based on the maximum gradation value and the minimum gradation value of pixels included in the character-like region the threshold of binarization used exclusively for the character-like region, and acquires based the threshold of binarization a corrected region where the character-like region is binarized (Step SA-4).

Figure 11:
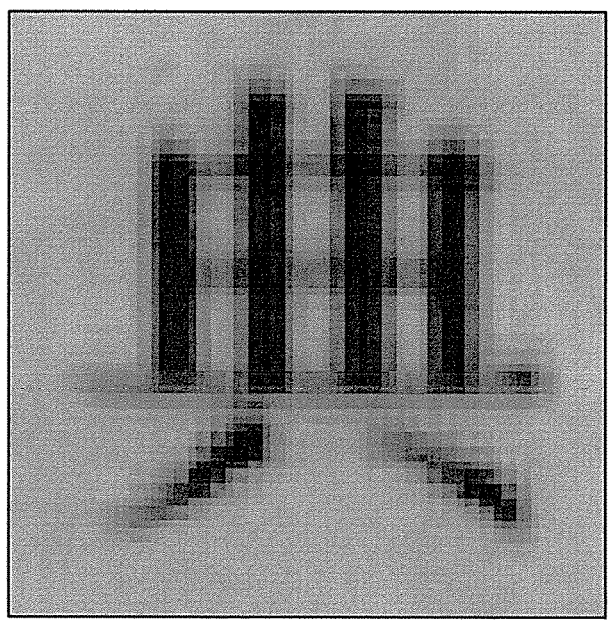
FIG. 11 is a diagram of an example of an input image according to the embodiment.
Figure 12:
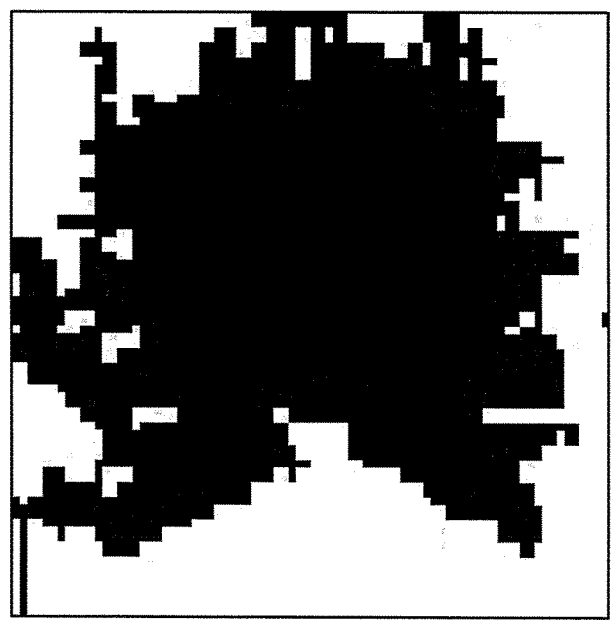
FIG. 12 is a diagram of an example of a character-like region according to the embodiment.
Figure 13:
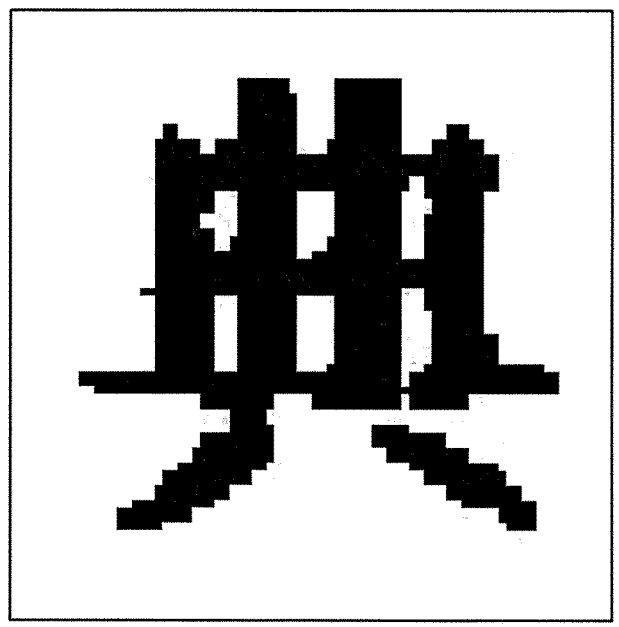
FIG. 13 is a diagram of an example of a corrected region according to the embodiment.
Figure 14:
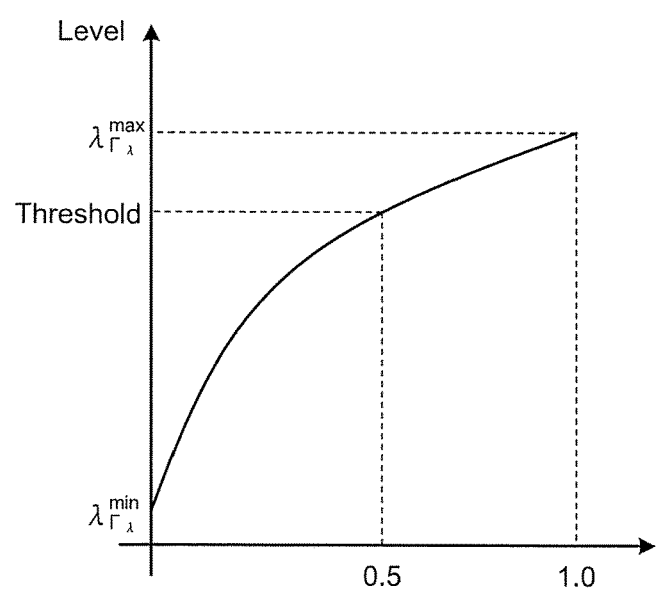
FIG. 14 is a graph of an example of threshold setting based on a cumulative frequency distribution of area according to the embodiment.

The following explains an example of a character recognizability correction according to the embodiment with reference to FIGS. 11 to 14. FIG. 11 is a diagram of an example of an input image according to the embodiment. FIG. 12 is a diagram of an example of a character-like region according to the embodiment. FIG. 13 is a diagram of an example of a corrected region according to the embodiment. And FIG. 14 is a graph of an example of a threshold setting based on a cumulative frequency distribution of area according to the embodiment.

In the embodiment, the extracted character-like region is corrected to improve the character recognizability.

For example in the embodiment, when the input image is an image of a kanji (Chinese character) in Mincho-font to be pronounced "ten" or "nori" as shown in FIG. 11, the character-like region is extracted as an image with inferior character recognizability as shown in FIG. 12.

Therefore in the embodiment, for performing correction with respect to the character-like region with inferior character recognizability, a threshold of binarization may be calculated by use of Formula 4 below based on information limited to the inside of the character-like region.

$$(\lambda_{\Gamma_\lambda}^{max} - \lambda_{\Gamma_\lambda}^{min}) \times \text{ratio} \quad \text{(Formula 4)}$$

And in the embodiment, binarization of the character-like region shown in FIG. 12 is carried out with the threshold calculated by use of Formula 4 to acquire a corrected region as shown in FIG. 13, thereby improving the character recognizability.

In the embodiment, when the ratio as shown in Formula 4 is 1.0, an uncorrected character-like region shown in FIG. 12 is acquired as a corrected region.

In the embodiment, when the ratio as shown in Formula 4 is 0.75, a corrected region shown in FIG. 13 is acquired.

Further in the embodiment, a threshold of binarization may be calculated without depending on a parameter.

For example in the embodiment, the graph shown in FIG. 14 is created by calculating a cumulative frequency distribution of the area from a pixel having the minimum gradation value to a pixel having the maximum gradation value within the character-like region shown in FIG. 12.

Regarding the fonts, the area of the character-like region can often be approximately as twice as the area of the corrected region with a high character recognizability. Therefore in the graph shown in FIG. 14, the threshold of binarization is set to a gradation value at which the relative cumulative frequency is 50% (0.5).

By employing this threshold, in the embodiment, a corrected region with an improved character recognizability is acquired from the character-like region shown in FIG. 12.

Returning to FIG. 2, the image acquiring unit 102d acquires a background region where the gradation value of pixels included in the region of the input image other than the corrected region is changed to a gradation value for background, and acquires binary image data of a binary image composed of the corrected region and the background region (Step SA-5), and the processing is ended.

Further, the image displaying unit 102e may display the binary image data acquired by the image acquiring unit 102d via the input/output unit and allow a user to check the data.

In this manner, in the embodiment, a binary image for distinguishing a corrected region and the remaining region is generated.

In the embodiment, when the corrected region is black (for example, in a gray scale, a gradation value is 0), the remaining region is set to be white (for example, in a gray scale, a gradation value is 255) to generate a binary image.

When the corrected region is white, the remaining region is set to be black so as to generate a binary image.

The following explains an example of binary processing according to the embodiment with reference to FIGS. 15 to 22. FIG. 15, FIG. 17, FIG. 19 and FIG. 21 are drawings each showing an example of an input image in the embodiment. FIG. 16, FIG. 18, FIG. 20 and FIG. 22 are drawings each showing an example of a binary image in the embodiment.

Figure 15:
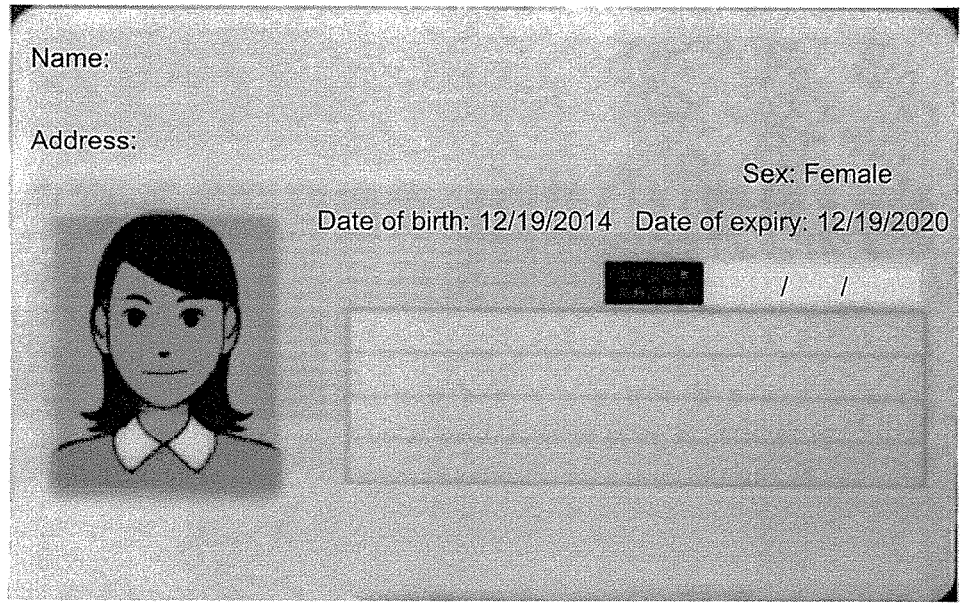
FIG. 15 is a diagram of an example of an input image according to the embodiment.
Figure 16:
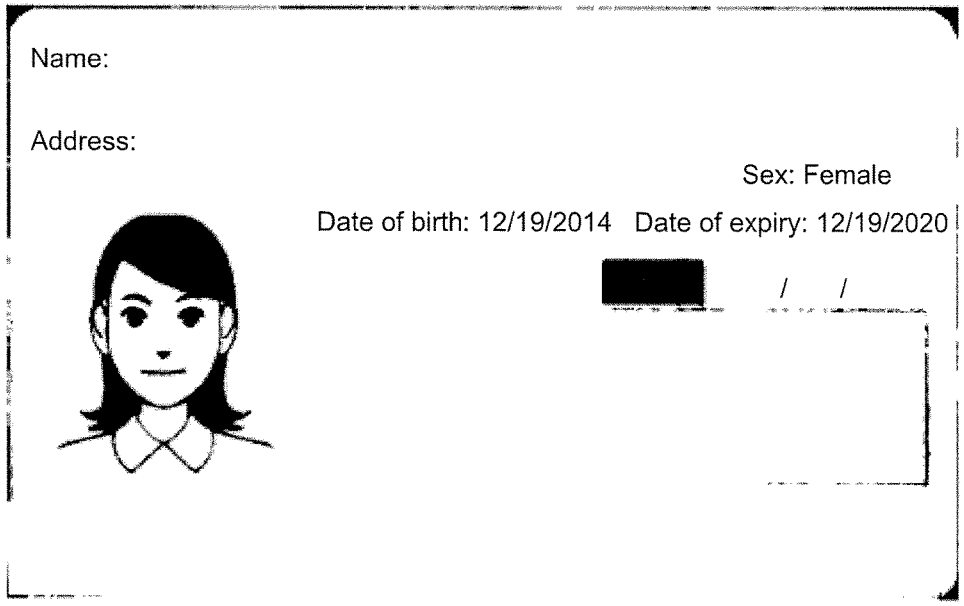
FIG. 16 is a diagram of an example of a binary image according to the embodiment.

When the binarization processing is applied to the image of FIG. 15 where no image degradation factors are found, a highly-accurate binary image as shown in FIG. 16 can be obtained in the embodiment because of absence of image degradation factors.

Figure 17:
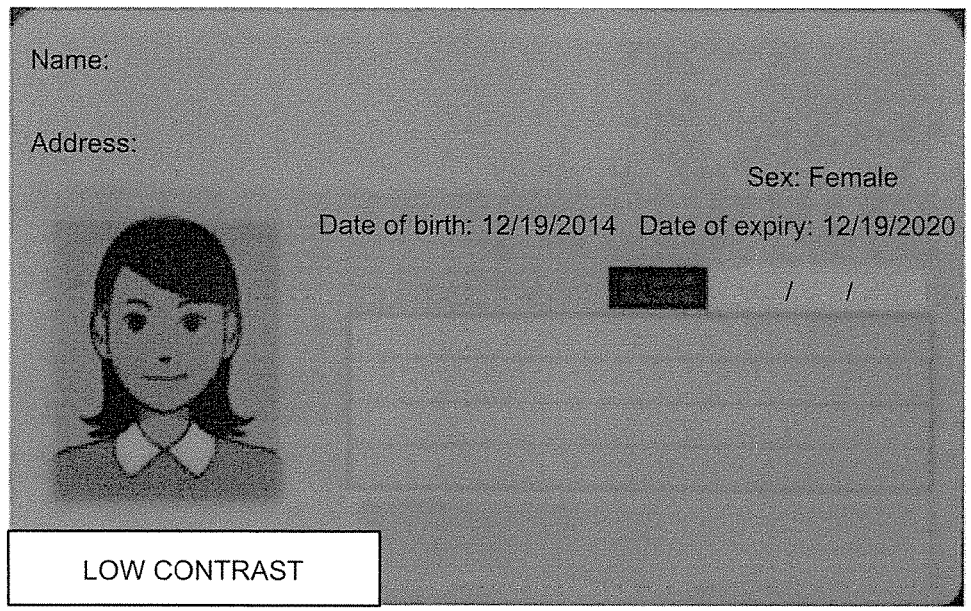
FIG. 17 is a diagram of an example of an input image according to the embodiment.
Figure 18:
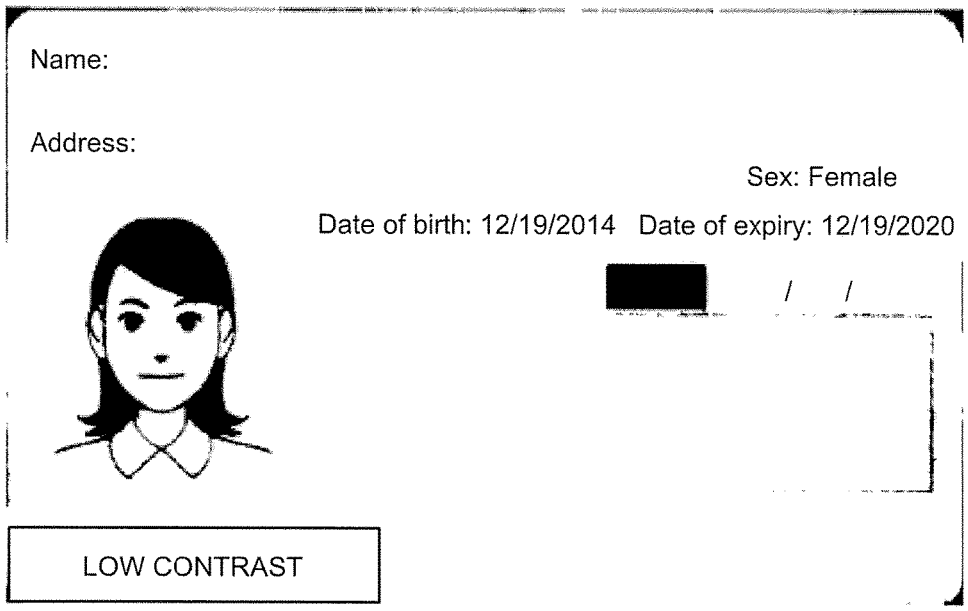
FIG. 18 is a diagram of an example of a binarized image according to the embodiment.

When the binarization processing is applied to the image of FIG. 17 taken with a mobile camera and having an image degradation factor of low contrast, similarly a highly-accurate binary image as shown in FIG. 18 can be obtained in the embodiment.

Figure 19:
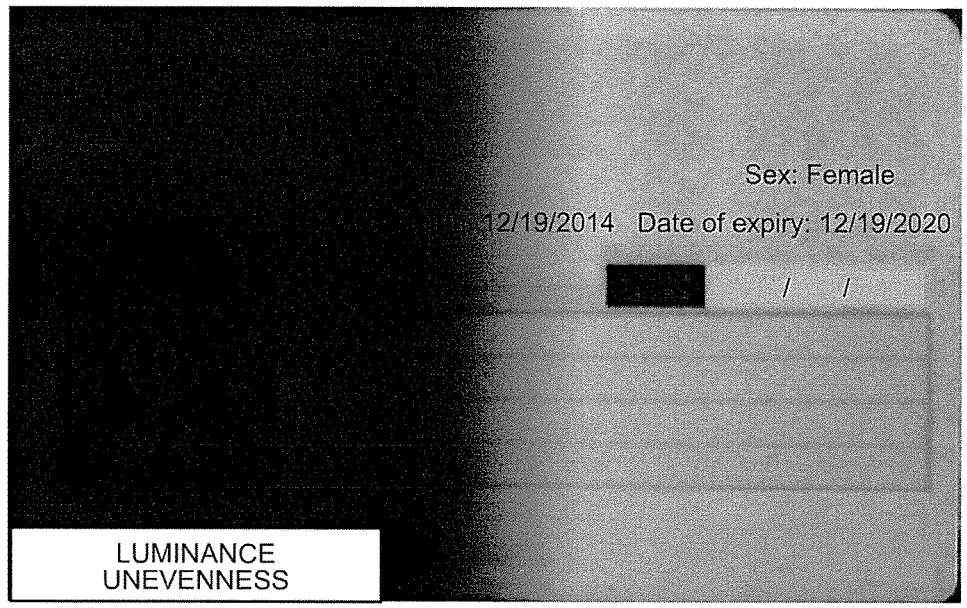
FIG. 19 is a diagram of an example of an input image according to the embodiment.
Figure 20:
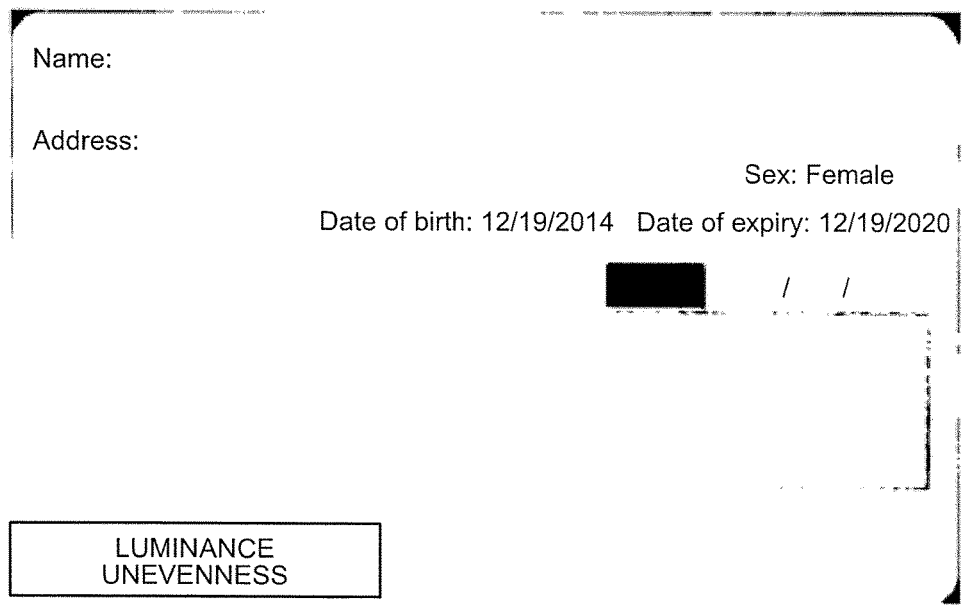
FIG. 20 is a diagram of an example of a binary image according to the embodiment.

Further, the binarization processing is applied to the image of FIG. 19 taken with a mobile camera and having an image degradation factor of luminance unevenness. In the embodiment, the binary image shown in FIG. 20 has characters of high-accuracy similarly to an image where no image degradation factors are found.

Figure 21:
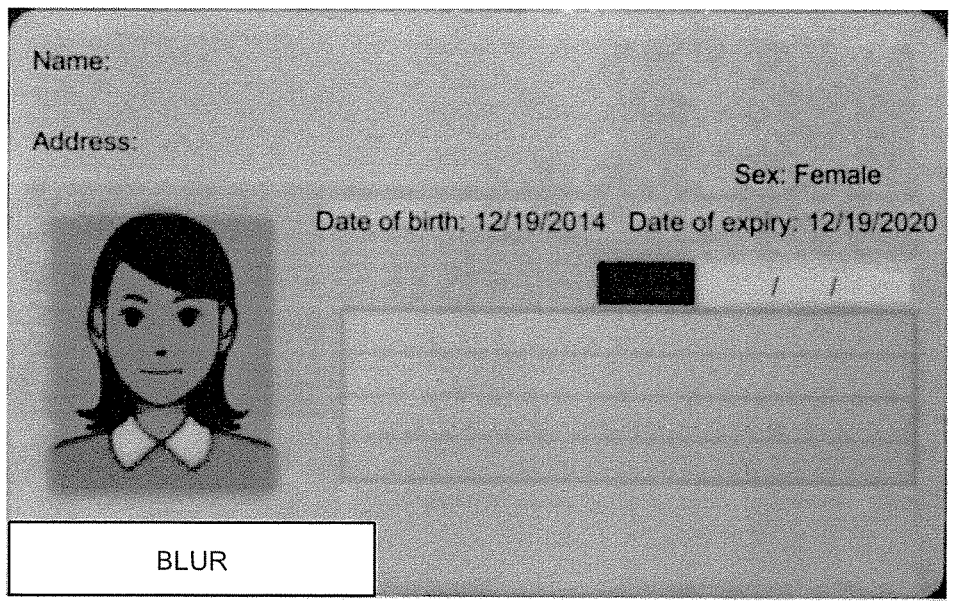
FIG. 21 is a diagram of an example of an input image according to the embodiment.
Figure 22:
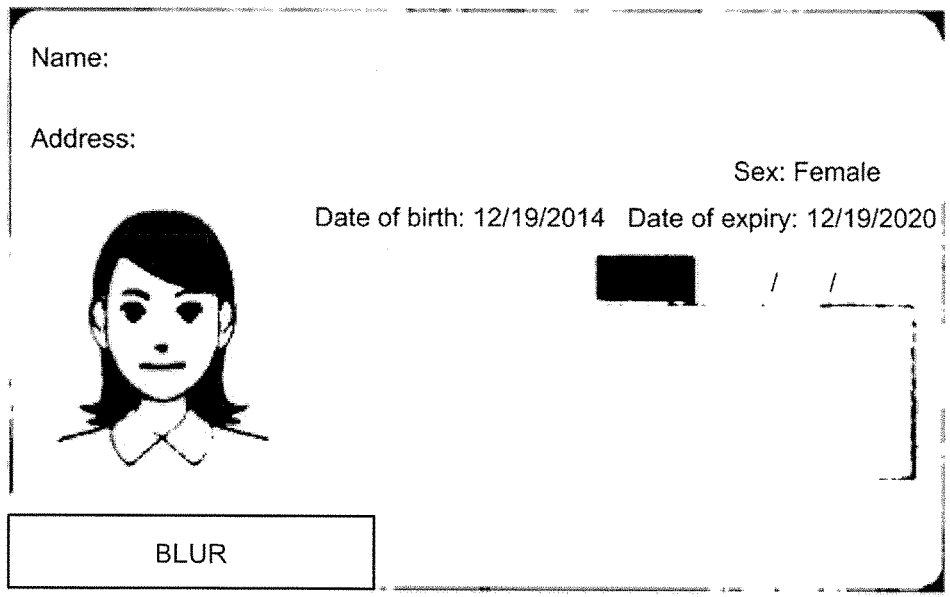
FIG. 22 is a diagram of an example of a binary image according to the embodiment.

Further, the binarization processing is applied to the image of FIG. 21 taken with a mobile camera and having an image degradation factor of blur. In the embodiment, a highly-accurate binary image can be obtained as shown in FIG. 22 although the character region is slightly eroded.

In this manner, in the embodiment, even for an image with any image degradation factor, it is possible to extract robustly only the character region and binarize the region without considerably modifying the character region.

When the OCR processing was performed with respect to the binary image data acquired in the disclosure as described in JP-A-2015-26290, the OCR accuracy was 88% in average. When the OCR processing was performed with respect to the binary image data acquired by the binarization processing according to the embodiment, the OCR accuracy was improved to 98% in average.

The tendency toward high resolution of mobile camera device has allowed OCR with respect to camera image data. For example, for personal authentication, identification cards (such as a driver's license, an individual number card called "My Number Card", and a residence card) are scanned easily with a camera and subjected to OCR.

However, unlike a scanner image, a camera image has a problem that quite a few image degradation factors (luminance unevenness, noise, blur, low contrast or the like) caused by the environment in photographing a subject and caused by devices would be included in the image.

Due to these image degradation factors, a binary image by the conventional binarization can inevitably include partially-missing characters, noise and the like that may result in OCR false recognition, and thus a high OCR accuracy cannot be achieved.

Therefore in the embodiment, a character region as a foreground is extracted from a hierarchical data structure of connected components representing an inclusion relation corresponding to a gradation value sequence of pixels, and a binary image is generated from the extracted region.

In other words, for each gradation value, pixels of not less than or not more than the gradation value, which are neighboring and in a connected relation, are identified as a connected component.

And in the embodiment, data that represents a hierarchical structure (Connected Component Tree) of regions representing an inclusion relation corresponding to the sequence of gradation values among connected components are generated.

Further in the embodiment, a character-like region is extracted from the generated data. Then, character recognizability in the extracted character-like region is corrected, whereby a binary image to distinguish the corrected region and the remaining region is generated.

Though there have been techniques to extract a character-like region from a hierarchical structure, the techniques are limited to extraction of a character-like region. There has not been any processing of correcting a region to have a shape recognizable at a high accuracy in OCR.

In contrast, in the embodiment, a character-like region is extracted and then the extracted character-like region is corrected to improve the character recognizability.

Further in the embodiment, a region with improved character recognizability is acquired as a binary region, whereby the region can be used for various purposes.

The image data that can be used for various purposes may be image data having a smaller data capacity in comparison with color image data, image data of a level that requires many OCR engines for reading or the like.

Other Embodiments

The embodiment of the present disclosure has been explained so far. Besides the foregoing embodiment, the present disclosure can also be carried out in various different embodiments within the scope of the technical idea described in the claims.

For example, the image-processing apparatus 100 may perform processing in a standalone mode, or may perform processing according to a request from a client terminal (separate from the image-processing apparatus 100) and then return the results of the processing to the client terminal.

Out of the processes explained in relation to the embodiment, all or some of the processes explained as being automatically performed may be manually performed, or all or some of the processes explained as being manually performed may be automatically performed by publicly known methods.

Besides, the process steps, the control steps, the specific names, the information including registered data for the processes or parameters such as search conditions, the screen examples, or the database configurations described or illustrated herein or the drawings can be appropriately changed if not otherwise specified.

The constituent elements of the image-processing apparatus 100 shown in the drawings are conceptual functions and do not necessarily need to be physically configured as shown in the drawings.

For example, all or any part of the processing functions included in the units of the image-processing apparatus 100, in particular, the processing functions performed by the control unit 102 may be implemented by the CPU or programs interpreted and executed by the CPU, or may be implemented by wired logic-based hardware.

The programs including programmed instructions for causing a computer to execute methods according to the present disclosure described later are recorded in non-transitory computer-readable recording media, and are mechanically read by the image-processing apparatus 100 as necessary. Specifically, the computer programs for giving instructions to the CPU to perform various processes in cooperation with an operating system (OS) are recorded in the storage unit 106 such as a ROM or an HDD. The computer programs are loaded into the RAM and executed, and constitute a control unit in cooperation with the CPU.

The computer programs may be stored in an application program server connected to the image-processing apparatus 100 via an appropriate network, and may be entirely or partly downloaded as necessary.

The programs according to the present disclosure may be stored in computer-readable recording media or may be formed as program products. The "recording media" include any portable physical media such as a memory card, a USB memory, an SD card, a flexible disc, a magneto optical disc (MO), a ROM, an erasable programmable read only memory (EPROM), an electrically erasable programmable read only memory (EEPROM), a compact disc read only memory (CD-ROM), a DVD, and a Blu-ray (registered trademark) disc.

The "programs" constitute data processing methods described in an appropriate language or by an appropriate describing method, and are not limited in format such as source code or binary code. The "programs" are not limited to singly-configured ones but may be distributed into a plurality of modules or libraries or may perform their functions in conjunction with another program typified by an OS. Specific configurations for reading the recording media by the units according to the embodiment, specific procedures for reading the programs, or specific procedures for installing the read programs may be well-known configurations or procedures.

The various databases and others stored in the storage unit 106 may be storage units such as any one, some, or all of a memory device such as a RAM or a ROM, a fixed disc device such as a hard disc, a flexible disc, and an optical disc, and may store any one, some, or all of various programs, tables, databases, and web page files for use in various processes and web site provision.

The image-processing apparatus 100 may be an information processing apparatus such as a well-known personal computer, and an appropriate peripherals may be connected to the information processing apparatus. The image-processing apparatus 100 may be embodied by providing the information processing apparatus with software (including programs, data, and the like) for implementing the methods according to the present disclosure.

Further, the specific modes of distribution and integration of the devices are not limited to the ones illustrated in the drawings but all or some of the devices may be functionally or physically distributed or integrated by a predetermined unit according to various additions and the like or functional loads. That is, the foregoing embodiments may be carried out in any appropriate combination or may be selectively carried out.

According to the present disclosure, a highly accurate binary image of a character region as a foreground can be acquired without performing OCR processing, based on the hierarchical structure of connected components representing an inclusion relation corresponding to the gradation value sequence of pixels.

According to the present disclosure, a binary image having a high character recognizability can be generated without depending on photographing environment or photographing equipment by performing a binarization method based on character region extraction.

Further, the present disclosure can provide a high OCR accuracy by improving the character recognizability.

Although the disclosure has been described on specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image-processing apparatus comprising:
   a memory; and
   a processor coupled to the memory, wherein
   the processor executes a process comprising:
   identifying for each gradation value in a set of gradation values a connected component of pixels of not less than or not more than the gradation value neighboring and connected to each other in an input image;
   generating hierarchical structure data of a hierarchical structure including identified connected component;
   determining based on the hierarchical structure data whether the identified connected component satisfies a feature of character likelihood;
   extracting the identified connected component satisfying the feature of character likelihood as a character-like region;
   acquiring based on a maximum gradation value and a minimum gradation value of pixels included in the character-like region a threshold of binarization used exclusively for the character-like region;
   acquiring based on the threshold of binarization a corrected region where the character-like region is binarized;
   acquiring a background region where a gradation value of a pixel included in a region of the input image other than the corrected region is changed to a gradation value for a background; and
   acquiring binary image data of a binary image composed of the corrected region and the background region.

2. The image-processing apparatus according to claim 1, wherein
   the generating includes generating the hierarchical structure data of the hierarchical structure including the identified connected component of all of the gradation values.

3. The image-processing apparatus according to claim 1, wherein
   the generating includes generating the hierarchical structure data of the hierarchical structure based on a gradation width.

4. The image-processing apparatus according to claim 1, wherein
   the extracting includes determining based on the hierarchical structure data whether the identified connected component satisfies a character-like sharpness, and extracting the identified connected component satisfying the character-like sharpness as the character-like region.

5. The image-processing apparatus according to claim 1, wherein
   the extracting includes determining based on the hierarchical structure data whether the identified connected component satisfies a character-like contrast, and extracting the identified connected component satisfying the character-like contrast as the character-like region.

6. The image-processing apparatus according to claim 1, wherein
   the extracting includes determining based on the hierarchical structure data whether the identified connected component satisfies a character-like area, and extracting the identified connected component satisfying the character-like area as the character-like region.

7. The image-processing apparatus according to claim 1, wherein
the acquiring the threshold includes acquiring a threshold of binarization used exclusively for the character-like region, the threshold being a value obtained by multiplying a difference between the maximum gradation value and the minimum gradation value of the pixels included in the character-like region by a predetermined parameter, and
the acquiring the corrected region includes acquiring based on the threshold of binarization a corrected region where the character-like region is binarized.

8. The image-processing apparatus according to claim 1, wherein
the acquiring the threshold includes generating a cumulative frequency distribution of an area from a pixel having the minimum gradation value to a pixel having the maximum gradation value included in the character-like region, acquiring a gradation value where a relative cumulative value occupies a predetermined ratio in the cumulative frequency distribution as the threshold of binarization used exclusively for the character-like region, and acquiring based on the threshold of binarization the corrected region where the character-like region is binarized.

9. The image-processing apparatus according to claim 4, wherein
when a dividend is a difference between an area of the identified connected component and an area of a neighboring connected component on the hierarchical structure and a divisor is an area of the neighboring connected component,
the determining includes determining based on the hierarchical structure data whether a quotient of the dividend and the divisor satisfies a threshold of character-like sharpness, and
the extracting includes extracting the identified connected component as the character-like region when the quotient is determined as satisfying the threshold of character-like sharpness.

10. The image-processing apparatus according to claim 5, wherein
the determining includes determining based on the hierarchical structure data whether a difference between the maximum gradation value and the minimum gradation value of the pixels included in the identified connected component satisfies a threshold of character-like contrast, and
the extracting includes extracting the identified connected component as the character-like region when the difference is determined as satisfying the threshold of character-like contrast.

11. The image-processing apparatus according to claim 6, wherein
the determining includes determining based on the hierarchical structure data whether the area of the identified connected component satisfies a threshold of character-like area, and
the extracting includes extracting the identified connected component as the character-like region when the area of the identified connected component is determined as satisfying the threshold of character-like area.

12. An image-processing method comprising:
identifying for each gradation value in a set of gradation values a connected component of pixels of not less than or not more than the gradation value neighboring and connected to each other in an input image;
generating hierarchical structure data of a hierarchical structure including the identified connected component;
determining based on the hierarchical structure data whether the identified connected component satisfies a feature of character likelihood;
extracting the identified connected component satisfying the feature of character likelihood as a character-like region;
acquiring based on a maximum gradation value and a minimum gradation value of pixels included in the character-like region a threshold of binarization used exclusively for the character-like region;
acquiring based on the threshold of binarization a corrected region where the character-like region is binarized;
acquiring a background region where a gradation value of a pixel included in a region of the input image other than the corrected region is changed to a gradation value for a background; and
acquiring binary image data of a binary image composed of the corrected region and the background region.

13. A computer program product having a non-transitory tangible computer readable medium including programmed instructions for causing, when executed by a computer,
the computer to perform an image-processing method comprising:
identifying for each gradation value in a set of gradation values a connected component of pixels of not less than or not more than the gradation value neighboring and connected to each other in an input image;
generating hierarchical structure data of a hierarchical structure including the identified connected component;
determining based on the hierarchical structure data whether the identified connected component satisfies a feature of character likelihood;
extracting the identified connected component satisfying the feature of character likelihood as a character-like region;
acquiring based on a maximum gradation value and a minimum gradation value of pixels included in the character-like region a threshold of binarization used exclusively for the character-like region;
acquiring based on the threshold of binarization a corrected region where the character-like region is binarized;
acquiring a background region where a gradation value of a pixel included in a region of the input image other than the corrected region is changed to a gradation value for a background; and
acquiring binary image data of a binary image composed of the corrected region and the background region.

* * * * *